United States Patent
Knott et al.

(10) Patent No.: US 8,915,058 B2
(45) Date of Patent: Dec. 23, 2014

(54) HEAT TRANSFER ARRANGEMENT FOR FLUID-WASHED SURFACES

(75) Inventors: David S Knott, Loughborough (GB); Alexis Lambourne, Kilburn (GB); Andrew M Rolt, Derby (GB); Cosimo Buffone, Nottingham (GB)

(73) Assignee: Rolls-Royce PLC, London (GB)

( * ) Notice: Subject to any disclaimer, the term of this patent is extended or adjusted under 35 U.S.C. 154(b) by 846 days.

(21) Appl. No.: 13/067,484

(22) Filed: Jun. 3, 2011
(Under 37 CFR 1.47)

(65) Prior Publication Data
US 2011/0296811 A1    Dec. 8, 2011

(51) Int. Cl.
*F28F 13/14* (2006.01)
*F02C 7/047* (2006.01)
*F01D 5/18* (2006.01)

(52) U.S. Cl.
CPC . *F01D 5/18* (2013.01); *Y02T 50/67* (2013.01); *Y02T 50/672* (2013.01); *Y02T 50/673* (2013.01); *Y02T 50/676* (2013.01)
USPC .......... 60/39.093; 244/134 R; 244/134 B; 244/134 C; 244/134 D; 165/146; 165/133; 29/890.032

(58) Field of Classification Search
CPC .. F28F 13/14; F02C 7/047; B64D 2033/0233; B64D 15/00; B64D 15/02; B64D 15/04; B64D 15/06; B64D 15/08; B64D 15/10; B64D 15/12; B64D 15/14; B64D 15/16; B64D 15/163; B64D 15/166; B64D 15/20; B64D 15/22; F01D 25/02; F05B 2260/208; B64F 5/0054; B64F 5/0063; B64F 5/0072; F28D 15/046
USPC .......... 60/39.093; 244/134 R, 134 B, 134 C, 244/134 D; 165/104.26, 104.21, 146, 133, 165/180; 29/890.032
See application file for complete search history.

(56) References Cited

U.S. PATENT DOCUMENTS 2,091,395 A * 8/1937 Perrin .................. 244/134 C
2,406,367 A * 8/1946 Griffith et al. ........... 244/134 D
(Continued)

FOREIGN PATENT DOCUMENTS

| EP | 1 884 628 A2 | 2/2008 |
| EP | 2 136 265 A2 | 12/2009 |
| JP | A-61-259090 | 11/1986 |

OTHER PUBLICATIONS

Sep. 23, 2010 Search Report issued in Great Britain Application No. GB1009264.1.

*Primary Examiner* — Phutthiwat Wongwian
*Assistant Examiner* — Michael B Mantyla
(74) *Attorney, Agent, or Firm* — Oliff PLC

(57) ABSTRACT

A heat transfer arrangement for a fluid-washed body having first and second ends and a fluid-washed surface extending there-between. The arrangement includes a heat transfer member extending from the first end at least part way along the body towards the second end. A heat source is arranged in use to heat the heat transfer member in the vicinity of the first end of the body. A plurality of thermal control layers are provided on the heat transfer member, each of the layers having a different thermal conductivity and being juxtaposed so as to create a thermal conductivity profile which varies along the length of the member. The arrangement may be used for prevention of icing of an aerofoil body such as a blade, vane or the like.

15 Claims, 2 Drawing Sheets

(56) References Cited

U.S. PATENT DOCUMENTS

| | | | |
|---|---|---|---|
| 2,418,205 A * | 4/1947 | Taylor | 244/134 A |
| 2,454,874 A * | 11/1948 | Hunter | 244/134 D |
| 2,464,273 A * | 3/1949 | Tanchel | 244/134 D |
| 2,478,206 A * | 8/1949 | Redding | 60/226.1 |
| 2,754,398 A * | 7/1956 | Rainbow | 219/201 |
| 3,057,154 A * | 10/1962 | Sherlaw et al. | 60/39.093 |
| 3,423,052 A * | 1/1969 | Lear | 244/134 C |
| 3,880,232 A * | 4/1975 | Parker | 165/166 |
| 3,885,622 A * | 5/1975 | McLain | 165/179 |
| 4,478,275 A * | 10/1984 | Ernst | 165/133 |
| 5,029,440 A * | 7/1991 | Graber et al. | 60/39.093 |
| 5,439,351 A * | 8/1995 | Artt | 416/95 |
| 6,129,314 A * | 10/2000 | Giamati et al. | 244/134 R |
| 6,227,492 B1 * | 5/2001 | Schellhase et al. | 244/134 D |
| 6,330,986 B1 * | 12/2001 | Rutherford et al. | 244/134 E |
| 6,990,797 B2 * | 1/2006 | Venkataramani et al. | 60/204 |
| 7,131,612 B2 * | 11/2006 | Baptist et al. | 244/134 R |
| 7,281,318 B2 * | 10/2007 | Marshall et al. | 29/621 |
| 7,465,150 B2 * | 12/2008 | Ahmad | 415/116 |
| 7,520,315 B2 * | 4/2009 | Hou et al. | 165/104.26 |
| 7,594,537 B2 * | 9/2009 | Hou et al. | 165/104.26 |
| 7,696,456 B2 * | 4/2010 | Brittingham et al. | 219/634 |
| 7,823,374 B2 * | 11/2010 | Venkataramani et al. | 60/39.093 |
| 7,900,438 B2 * | 3/2011 | Venkataramani et al. | 60/267 |
| 7,923,668 B2 * | 4/2011 | Layland et al. | 219/535 |
| 8,459,341 B2 * | 6/2013 | Chang et al. | 165/104.26 |
| 8,590,601 B2 * | 11/2013 | Lee | 165/104.26 |
| 2006/0162906 A1 * | 7/2006 | Hong et al. | 165/104.26 |
| 2006/0162907 A1 * | 7/2006 | Wu et al. | 165/104.26 |
| 2006/0219391 A1 * | 10/2006 | Hong et al. | 165/104.26 |
| 2006/0283575 A1 * | 12/2006 | Pai | 165/104.26 |
| 2007/0246194 A1 * | 10/2007 | Hou et al. | 165/104.26 |
| 2007/0251673 A1 * | 11/2007 | Hou et al. | 165/104.26 |
| 2008/0099617 A1 * | 5/2008 | Gilmore et al. | 244/134 R |
| 2011/0089784 A1 * | 4/2011 | Russberg | 310/306 |
| 2011/0297269 A1 * | 12/2011 | Pilon et al. | 138/141 |

* cited by examiner

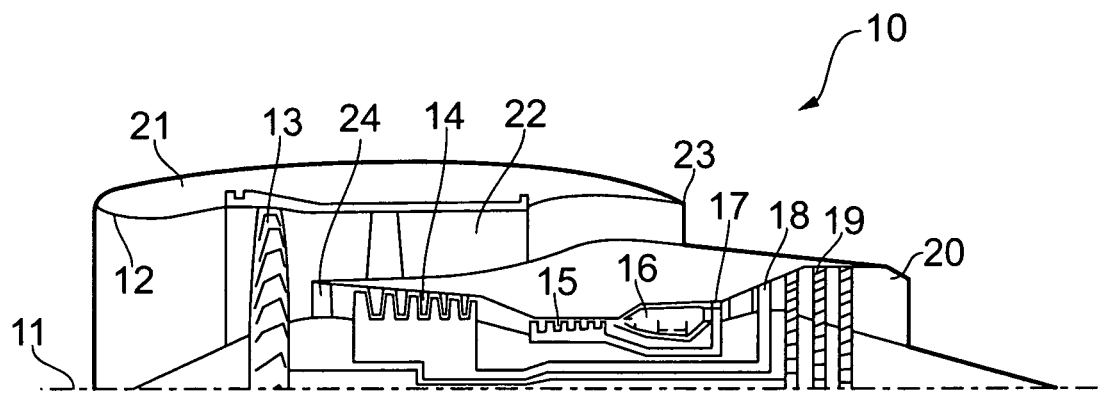
FIG. 1
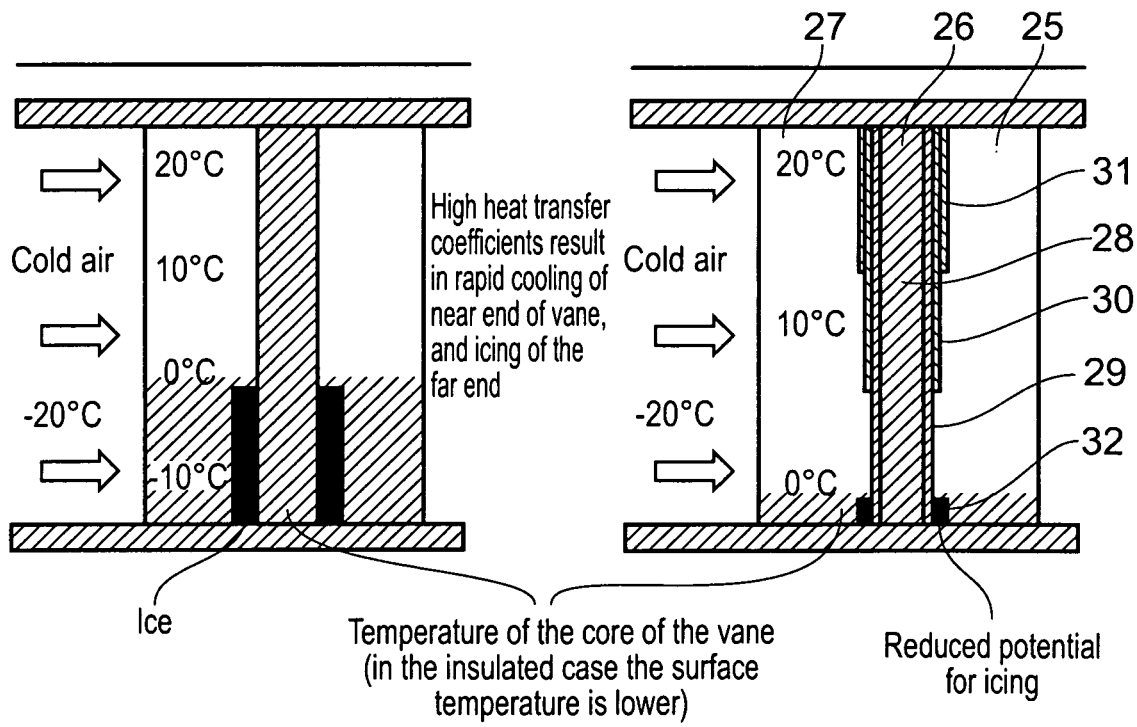
FIG. 2 (Prior Art)
FIG. 3

HEAT TRANSFER ARRANGEMENT FOR FLUID-WASHED SURFACES

The present invention relates to a heat transfer arrangement and more particularly, although not exclusively, to a heat transfer arrangement for use in preventing ice accumulation on fluid washed objects.

Heat transfer between solid and a fluid that washes it is governed by the Newton law:

$$Q = hA(T_s - T_f)$$

where Q is the heat transfer rate (W); h is the convective heat transfer coefficient (W/mK); A is the surface area washed by the fluid (m²) and $(T_s - T_f)$ is the temperature difference, $\Delta T$, between the surface $(T_s)$ and the fluid $(T_f)$ mean temperature (° K).

One approach to controlling the heat transfer between a solid and fluid would be to modify the washed surface area, A. However for many aerodynamic surfaces, the surface must be optimised for aerodynamic performance and there is little scope to modify it for heat transfer reasons. Similarly, the flow rate of fluid over the surface is often dictated by other parameters, which it would be impractical to control purely to avoid ice accretion.

Thermal Barrier Coatings have been proposed for use in gas turbine engine (GTE) turbine blade applications, where the aim is to protect the core turbine blade from very high temperature flows which can exceed the melting point of the core blade material. This is achieved by the use of very low thermal conductivities typical of ceramics. These materials also have the benefit that they can be operated at much higher temperatures than metal alloys which are typically used as turbine blade core materials.

However, for gas washed surfaces which are prone to ice accumulation in use—such as surfaces of wind turbines, radio masts, upstream surfaces of a gas turbine engine and the like—it will be appreciated that the fluid flow over the surface will have a cooling effect which promotes icing of the surface in the presence of water. Such ice accretion can be a significant problem where the gas washed surface serves an aerodynamic purpose, such as is the case, for example, with a gas turbine engine EES (Engine Section Stator).

Accordingly, it has in the past been proposed to heat such components internally by passing conduits bearing heated oil (or other fluid) there-through. However for a number of components or applications, the geometry or other operational limitations make it impractical to insert heat pipes. For example, the rotating frame of reference for a wind turbine or propeller blade array significantly complicates the delivery of heat transfer fluid. Also, in the case of an ESS, oil cannot be taken down the ESS core as a possible leak could contaminate aircraft cabin air, for which thermal and pressure control is achieved by spilling core engine air.

Even if such factors could be overcome, the available geometry can restrict the diameter of heat transfer conduits to such an extent that insufficient heating is achievable. For example, using a relatively small diameter heat pipe of less than 2 mm, the amount of heat the heat pipe can transfer is limited to a few tens of Watts. It has been estimated that a few hundreds of Watts are needed to avoid ice formation and accretion on the ESS.

It is an aim of the present invention to provide a heat transfer arrangement which can adequately heat a gas washed surface to reduce ice accretion under operational constraints such as those described above.

According to one aspect of the present invention there is provided a heat transfer arrangement for a fluid-washed body having first and second ends and a fluid-washed surface extending there-between, said arrangement comprising: a heat transfer member extending from the first end at least part way along the body towards the second end; a heat source arranged in use to heat the heat transfer member substantially towards the first end of the body; and, at least one thermal control layers on said heat transfer member, said at least one layer having a thermal conductivity which differs from that of the heat transfer member.

The, or each, thermal control layer may terminate part way along the heat transfer member and/or fluid washed body.

In one embodiment, the heat transfer arrangement comprises a plurality of thermal control layers, each having a thermal conductivity which differs from that of the heat transfer member. The thermal control layers may be juxtaposed so as to create a thermal conductivity profile which varies along the length of the member.

Additionally or alternatively, a thermal control layer of varying thickness along its length may be provided. In this manner a single layer may be used to provide a suitable varying thermal conductivity profile along the length of the member as required.

The heat transfer arrangement may be an anti-icing arrangement.

The arrangement may comprise first and second thermal control layers. The second—or outer—layer may overlay or cover only a portion of the first layer, which may represent an inner layer relative to the body. The first and/or second layers may be partial layers. The first layer typically covers a greater portion of the surface of the body than the second layer.

In one embodiment, the arrangement comprises a third thermal control layer. The third layer may be the outermost layer and may cover or overlay only a portion of the second layer. Accordingly either or both of the first and second thermal control layers may themselves be partially covered and/or partially exposed.

The first, second and—optionally—third layers may extend away from the region of application of the heat source, along the heat transfer member. Each layer may terminate a different distance from the first end of the body—and the associated heat transfer member—so as to provide substantially step changes in thermal conductivity along the heat transfer member at locations where each layer terminates.

The first, second and—optionally—third layers may have different thermal conductivities. The thermal conductivity of the first layer may be relatively high compared to that of the second layer. The thermal conductivity of the first layer may be higher than that of the heat transfer member. The thermal conductivity of the second layer may be lower than that of the heat transfer member or else a core portion of the heat transfer member.

The thermal control layer configuration typically provides a region of lowest thermal conductivity towards the first end of the body and/or the heat source. The thermal conductivity may increase with distance along the heat transfer member and may be greatest in a region in which only the first layer is present.

The thermal control layers take the form of external layers of the heat transfer member and may comprise coating layers.

The invention may allow heat to be more evenly dissipated to the fluid-washed surface of the body so as to reduce the likelihood of the occurrence of localised icing and/or hotspots. The combination of coatings having relatively high and low thermal conductivity coatings allows for the possibility of improved control of thermal management of a body which is prone to icing in use.

In one embodiment, the heat transfer member is locatable within the interior of the fluid-washed body. The heat transfer member may be finned in shape and may be located in a correspondingly shaped recess within the body.

In another embodiment, the heat transfer member may comprise a portion of the body itself such as a core or leading edge portion of the body. The heat transfer member may comprise an additional layer of body.

In one embodiment, the body comprises an aerofoil. The body may be a blade or vane and may be component of a gas turbine engine. The body may, for example, be a wind turbine blade or an ESS, strut or propeller of a gas turbine engine.

According to a preferred embodiment of the present invention there is proposed using a composite fin arrangement for providing heat transfer in aerofoils. The composite heating fin may be used to heat an aerofoil having a substantially solid body, through which heat can be conducted to a gas washed surface of the aerofoil.

According to a second aspect of the invention, there is provided a component having a body and a gas washed surface and a heat transfer arrangement according to the first embodiment.

Working embodiments of the present invention are described in further detail below by way of example with reference to the accompanying drawings, of which:

FIG. 1 shows a half longitudinal section of a turbo fan gas turbine engine to which the present invention may be applied;

FIG. 2 shows a sectional view of a structure according to the prior art;

FIG. 3 shows a sectional view of a structure according to one embodiment of the present invention;

Figure 4:
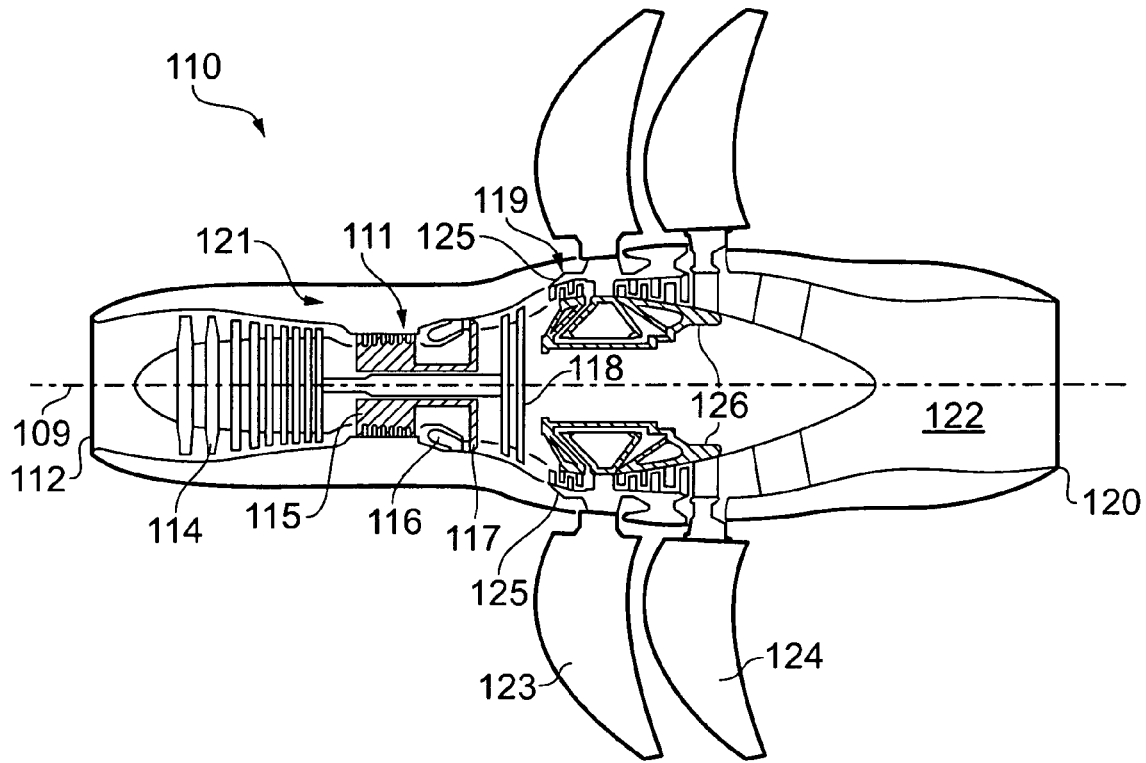
FIG. 4 shows a half longitudinal section of an open rotor gas turbine engine to which the present invention may be applied; and, FIG. 5 shows a sectional view of a structure according to a further embodiment of the present invention.

Two primary applications of the present invention within gas turbine engines are described below with reference to FIGS. 1-3 and 4-5 respectively. Although those embodiments are described with a degree of particularity due to engineering constraints and the like, it is to be understood that any individual concepts or features described in relation to one embodiment are to be considered as being applicable to any alternative embodiment wherever it is practicable to do so. Features should only be considered to be mutually exclusive where they are explicitly described as such.

Specific embodiments of present invention relate to the use of a composite fin concept to improve the heat transfer to a component which is prone to icing formation and accretion in use. A combination of high and low thermal conductivity coatings deposited on the external surface of the component or else on a heat transfer member therein is proposed as a strategy to control the heat transfer for the component.

Turning now to FIG. 1, there is shown a ducted fan gas turbine engine generally indicated at 10, which has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 12 is compressed by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Alternative gas turbine engine arrangements may comprise a two, as opposed to three, shaft arrangement and/or may provide for different bypass ratios. Other configurations known to the skilled person include open rotor designs, such as turboprop engines, geared turbofan engines or else turbojets, in which the bypass duct is removed. The various available gas turbine engine configurations are typically adapted to suit an intended operation which may include aerospace, marine, power generation amongst other propulsion or industrial pumping applications.

The following description proceeds in relation to a specific component 24, referred to as an Engine Section Stator (ESS) which is a fixed, non-rotating vane structure, the primary function of which is aerodynamic and which serves to turn, or otherwise guide, the flow of air downstream of the fan 13. Accordingly the problem of ice build-up is of particular concern for such a component. However the principles of the present invention may be applicable to other fixed or rotating components which are prone to icing.

One embodiment of the present invention proposes to use a composite fin arrangement as shown in FIG. 3. The ESS 25 is a partially hollow vane structure (usually formed of titanium) which may be treated as a fin. The ESS has a first, base end 26 and an opposing end 32, such that the ESS spans the passageway in which it is located. The ESS 25 in this embodiment is heated at the base 26 by circulating engine oil on the splitter's annulus. This is schematically represented by reservoir or conduit 27 through which heated oil passes during operation of the engine so as to provide a heat source at one end 26 of the ESS.

A heat transfer member 28 extends from the base 26 through the core of the ESS body towards its opposing end 32. In this embodiment the heat transfer member comprises a solid body which is finned in shape and typically formed of metal. Dependent on weight considerations, etc, the heat transfer member may itself be hollow.

The heat transfer member has a plurality of coating layers 29, 30 and 31. The innermost layer 29 comprises a high thermal conductivity coating, which may comprise a material structure such as Diamond Like Carbon, Carbon Fibres, Carbon Nanotubes, graphite or CVD deposited graphite. Of the layers, the innermost layer 29 extends the greatest distance from the base end 26 along the length of the heat transfer member, and, in this embodiment, the innermost layer 29 extends along the whole length of the heat transfer member (that is along the whole length of the ESS). In alternative embodiments the innermost layer 29 may terminate a distance from the end of the heat transfer member or ESS.

A low thermal conductivity coating, which may comprise a conventional Thermal Barrier Coatings, such as those used for turbine blade cooling applications, is used for coating layers 30 and 31. A ceramic material would be suitable for such applications although other conventional low-conductivity or insulating materials may be used.

The intermediate layer 30 is deposited over only a portion of the ESS heat transfer member, starting from the heat source at the base end 26 (i.e. the oil reservoir located in the splitter). The intermediate layer is smaller in dimensions than the innermost layer 29 and thus covers only a portion of the inner layer 29. Thus the intermediate layer 30 terminates at a distance closer to the base end 26 than the innermost layer 29.

The outer layer 31 is deposited over only a portion of the ESS heat transfer member, starting from the base end 26. The outermost layer is smaller in dimensions than the innermost 29 and intermediate layers 30 and thus covers only a portion of the intermediate layer 30. Thus the outer layer 31 terminates at a distance closer to the base end 26 than the intermediate layer 30.

The application of one or more low conductivity coatings 30, 31 limits heat loss in use from the end of vane nearest the heat source. The application of the outer coating 31 further limits heat loss in the region closest the heat source. The use of a high conductivity coating or insert improves heat transfer to the end of the vane, which is farthest from the heat source.

This strategy will allow heat conduction along the ESS, limiting the heat losses on the first portion of the ESS and providing a more uniform heating effect over the ESS.

In use, particularly when the gas turbine engine is operating at altitude or else in freezing conditions at ground level, cold air passes over the vane 25. Subject to the exact nature of the flow field, this has a cooling effect over the entire gas-washed surface of the vane. As can be seen in FIG. 2, in the case that no heat transfer control is provided, heat is dissipated rapidly towards the base end 26 of the ESS causing a relatively large temperature gradient between the opposing ends of the component. Thus a significant amount of heat is lost to the external airflow and is not efficiently dissipated to the entire surface area of the vane. This can result in a region on the surface of the component a distance from the base end, where icing conditions are established.

In comparison, the embodiment of FIG. 3 allows for a more gradual temperature gradient by conducting and dissipating heat towards the remote end of the vane and associated heat transfer member, such that the potential for icing across the gas-washed surface is significantly reduced.

The high thermal conductivity coatings (Diamond Like Carbon, Carbon Fibres and Carbon nanotubes graphite or CVD deposited graphite) are typically tough and capable of withstanding adverse environmental conditions such as impact from debris and hail ingested into the engine. For the low thermal conductivity coating, a suitable material which may offer the desired operational characteristics is Yttria Stabilised Zirconia (YSZ), the properties of which can serve to retard or inhibit the propagation of cracks which could potentially occur under adverse conditions.

It is possible that only the leading edge of the ESS necessitates localised heating because of icing accretion risks. Therefore, the coatings (high and low thermal conductivity) may be deposited only on a portion of the ESS surface. The extent of the ESS surface to be coated will depend on the actual ESS design, engine layout and operation. Accordingly the coating layers may cover a greater or lesser area of the aerofoil surface dependent on such application details and may even cover the entire gas-washed surface if required.

A further application of the present invention will now be described in relation to FIGS. 4 and 5 with reference to aerofoil components in the form of propeller blades such as those of a so-called 'open rotor' gas turbine engine architecture.

Referring to FIG. 4, a twin-spooled, contra-rotating propeller gas turbine engine is generally indicated at 110 and has a principal and rotational axis 109. The engine 110 comprises a core engine 111 having, in axial flow series, an air intake 112, an intermediate pressure compressor 114 (IPC), a high-pressure compressor 115 (HPC), combustion equipment 116, a high-pressure turbine 117 (HPT), low pressure turbine 118 (IPT), a free power turbine 119 (LPT) and a core exhaust nozzle 120. A nacelle 121 generally surrounds the core engine 111 and defines the intake 112 and nozzle 120 and a core exhaust duct 122. The engine 110 also comprises two contra-rotating propellers 123, 124 attached to and driven by the free power turbine 119, which comprises contra-rotating blade arrays 125, 126.

The gas turbine engine 110 works in a conventional manner so that air entering the intake 113 is accelerated and compressed by the IPC 114 and directed into the HPC 115 where further compression takes place. The compressed air exhausted from the HPC 115 is directed into the combustion equipment 116 where it is mixed with fuel and the mixture combusted. The resultant hot combustion products then expand through, and thereby drive the high, low-pressure and free power turbines 117, 118, 119 before being exhausted through the nozzle 120 to provide some propulsive thrust. The high, low-pressure and free power turbines 117, 118, 119 respectively drive the high and intermediate pressure compressors 115, 114 and the propellers 123, 124 by suitable interconnecting shafts. The propellers 123, 124 normally provide the majority of the propulsive thrust.

The blades 123 or 124 are formed with a heat transfer arrangement according to the present invention as shown in FIG. 6. Each blade in the arrays has a radially inner root portion 128, which serves as an attachment formation by which the propeller blade is attached to a hub or drum portion. Each blade has a body portion 129 which extends radially outwardly from the root when arranged for use, said body portion terminating at its free end or tip 132. The upstream and downstream intermediate edges of the blade between the root and tip are defined as the respective leading 130 and trailing 131 edges.

During operation a portion of the hot engine core flow resulting from the combustion process is discharged at 136 upstream the row of blades through a suitable conduit or aperture arrangement (not shown), resulting in heating of the blades at a radially inner portion 127 thereof. The hot gas flow is intercepted by the leading edge 130 of the propeller as it rotates in use and thus serves as a heat source Element 129 may be referred to as the blade core which can either be formed of a composite material or else metal. In the event that a composite blade is provided, as shown in FIG. 6, a metal leading edge 133 is provided, typically to improve the strength characteristics of the blade such that the blade can better withstand foreign object impact (such as birdstrike or hail).

The metallic leading edge is provided with a high-thermal conductivity coating/layer 134 which extends from the radially inner portion 127 outwards towards the blade tip. In this embodiment, the metal leading edge 133 stops short of the blade tip 132. The layer 134 stops short of the metal leading edge 133 and also the blade tip 132.

The layer 134 is divided into three primary sections, shown as 134a, 134b and 134c, all of which may be formed of a single layer of substantially uniform thickness.

Section 134a is the radially innermost section which is an outer layer portion of the composite blade. That is to say that section 134a is exposed to the external environment.

Section 134b is a radially intermediate section which extends across a mid portion of the blade's leading edge. Section 134b is covered by an additional layer 135, which comprises a low thermal conductivity material such as a thermal barrier coating. In order to accommodate the additional depth of the thermal barrier coating 135, the intermediate section 134b is recessed slightly. This is so that a uniform aerodynamic leading edge profile for the blade is maintained in spite of the surface modification proposed herein.

Section 134c is a radially outermost section which is an outer layer portion of the composite blade. That is to say that section 134c is exposed to the external environment.

In use, hot gas products emanating from the engine core are directed onto the leading edge of the blade, and more particularly onto the radially inner portion 134a of the layer 134. The section 134a is thus exposed to elevated gas temperatures which serve as a heat source for preventing icing of the blade. The section 134 and the metal leading edge 133 (or else the blade itself in the embodiment of a metallic, rather than composite-type, blade) conducts heat energy in a radially outward direction along the blade towards the tip.

The layer 135 serves to reduce uncontrolled loss of heat over the intermediate section of the blade due to the cold free stream air which passes there-over in use. In contrast, the intermediate section is insulated to a degree by the layer 135 such that the leading edge is heated only sufficiently to prevent accumulation of ice over the intermediate section, and a significant amount of heat which is superfluous to this goal is conducted to the outer section 134c. Accordingly the exposed high-conductivity layer 134c in the radially outer blade section can be heated in an improved manner so as to avoid accumulation of ice thereon caused by cold free stream air.

It will be appreciated that either a Thermal Barrier Coating or the composite/metal blade is exposed to the cold free stream air in the intermediate section such that the high-conductivity material is protected and/or insulated. Thus layer 134b is behind layer 135 in that region only.

Figure 5:
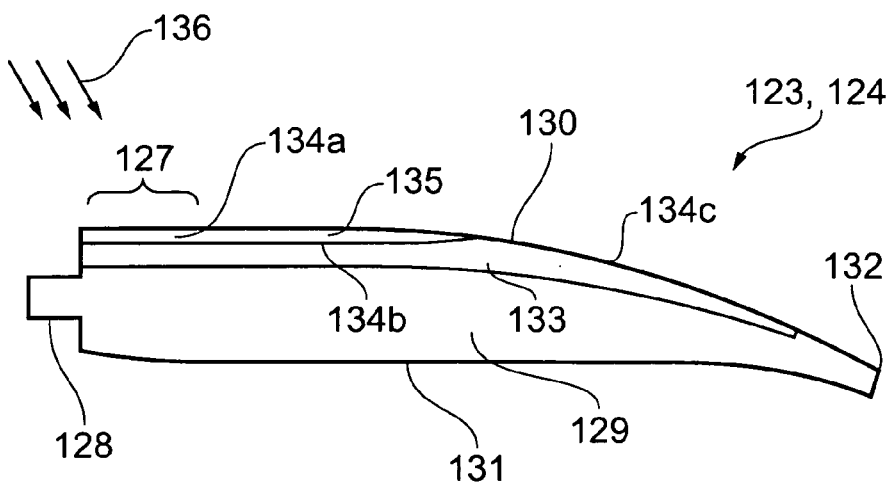

As with the embodiment of FIG. 3, the embodiment of FIG. 5 may also have an additional partial low thermal conductivity coating layer over the radially inner section of layer 135. Layers 134b and 135 may be recessed accordingly to accommodate the additional depth of such a partial layer. Thus the intermediate leading edge section may comprise a greater and lesser insulating region as described above.

An added benefit of using high conductivity coating/layer is to transport heat along the blade length and therefore reduce the temperature of the blade core. This form of temperature management may reduce the temperature-related problems associated with the use of so-called composite blades, when compared to conventional metal blades. This is because the highest temperature experienced by the blade core is reduced compared with a blade for which no high thermal conductivity coating/layer is provided.

A more general aspect of the invention may be considered to provide a combination of relatively higher and lower thermal conductivity layers over an aerofoil or air-washed body in order to manage two-dimensional heat transfer within the blade so as to achieve conditions which reduce or eliminate the accumulation of ice on a fluid washed aerofoil surface.

It is also possible in a further development of the invention that a thermally anisotropic material may be used for any of the conductivity layers described above. Thus heat will be transferred along the length of the blade or from the mid chord to the leading edge in preference to around or through the blade core.

In alternative embodiments to those described above, a structure to be heated may have a plurality, rather than one, heat source, which may be arranged to heat the structure, for example, from opposing ends thereof. The skilled reader will appreciate that a heat transfer arrangement may thus be tailored such that the coating layer arrangement described above is modified to promote conduction of heat along a heating element towards a central region (rather than tip region) of such a structure. This may be achieved by providing one or more lo-conductivity layers towards each end region of the structure but which terminate towards the centre region of the structures length.

In further embodiments, a combination of high/low conductivity coatings/layers can also be used to control the heat transfer in and out of the propeller blades (such as those of Open Rotors) as an anti-icing mitigation strategy. The present invention can also help in mitigating the run-back icing issues that electric heating mats have on conventional leading edge anti-icing strategies.

The present invention may be applied to other thermal management or anti-icing/de-icing applications including telecommunication masts, wind turbines, aircraft wings and other gas fluid washed bodies intended for operation in freezing conditions.

The invention claimed is:

1. A heat transfer arrangement for a fluid-washed body having first and second ends and a fluid-washed surface extending there-between, said arrangement comprising:
   a heat transfer member extending from the first end at least part way along the body towards the second end;
   a heat source arranged in use to heat the heat transfer member in the vicinity of the first end of the body; and,
   a plurality of thermal control layers on said heat transfer member, each of said layers having a different thermal conductivity and being juxtaposed so as to create a thermal conductivity profile which varies along the length of the member,
   the plurality of control layers including first and second thermal control layers., wherein the second layer overlays a portion of the first layer such that the first layer covers a greater portion of the heat transfer member than the second layer,
   wherein the thermal conductivity of said first layer is greater than that of the heat transfer member and the thermal conductivity of said second layer is less than that of the heat transfer member.

2. A heat transfer arrangement according to claim 1, wherein the first and second layers extend from the region of application of the heat source along the heat transfer member, each layer terminating at a different distance along the heat transfer member so as to provide substantially step changes in thermal conductivity at locations where each layer terminates.

3. A heat transfer arrangement according to claim 1, wherein the thermal conductivity of the second layer is substantially less than that of the first layer.

4. A heat transfer arrangement according to claim 1, further comprising a third layer which overlays only a portion of said second layer.

5. A heat transfer arrangement according to claim 1, wherein the combined thickness of said thermal control layers varies along the length of the heat transfer member.

6. A heat transfer arrangement according to claim 5, wherein at least one of the heat transfer member or fluid washed body is recessed to accommodate the varying thickness of the combined thermal control layers such that the fluid washed surface of the body follows a generally smooth surface profile.

7. A heat transfer arrangement according to claim 1, wherein the thermal control layer configuration provides a region of lowest thermal conductivity towards the first end of the body and a region of greatest thermal conductivity towards the second end of the body.

8. A heat transfer arrangement according to claim 1, wherein the thermal control layers take the form of external coating layers of the heat transfer member.

9. A heat transfer arrangement according to claim 1, wherein at least one layer comprises a thermal barrier coating.

10. A heat transfer arrangement according to claim 1, wherein the heat transfer member comprises a core portion of the fluid-washed body.

11. A heat transfer arrangement according to claim 1, wherein the heat transfer member comprises a finned member located within a correspondingly shaped recess in the interior of the fluid-washed body.

12. A heat transfer arrangement according to claim 1, wherein the heat transfer member comprises an additional layer or leading edge portion of the body.

13. A heat transfer arrangement according to claim 1, wherein the body is an aerofoil.

14. A machine comprising a rotatable blade array, said machine having an aerofoil body comprising a heat transfer arrangement according to claim 1 for the prevention of ice accumulation on said body.

15. A gas turbine engine comprising an anti-icing arrangement for an aerofoil body having first and second ends and a fluid-washed surface extending there-between, said arrangement comprising:

a heat transfer member extending from the first end at least part way along the body towards the second end;

a heat source arranged in use to heat the heat transfer member in the vicinity of the first end of the body; and, a plurality of thermal control layers on said heat transfer member, each of said layers having a different thermal conductivity and being juxtaposed so as to create a thermal conductivity profile which varies along the length of the member, the plurality of control layers including first and second thermal control layers, wherein the second layer overlays a portion of the first layer such that the first layer covers a greater portion of the heat transfer member than the second layer, wherein the thermal conductivity of said first layer is greater than that of the heat transfer member and the thermal conductivity of said second layer is less than that of the heat transfer member.

* * * * *